United States Patent
Ambroladze et al.

(10) Patent No.: US 10,915,461 B2
(45) Date of Patent: Feb. 9, 2021

(54) MULTILEVEL CACHE EVICTION MANAGEMENT

(71) Applicant: INTERNATIONAL BUSINESS MACHINES CORPORATION, Armonk, NY (US)

(72) Inventors: Ekaterina M. Ambroladze, Somers, NY (US); Robert J. Sonnelitter, III, Mount Vernon, NY (US); Matthias Klein, Poughkeepsie, NY (US); Craig Walters, Highland, NY (US); Kevin Lopes, Wallkill, NY (US); Michael A. Blake, Wappingers Falls, NY (US); Tim Bronson, Round Rock, TX (US); Kenneth Klapproth, Travis, TX (US); Vesselina Papazova, Highland, NY (US); Hieu T Huynh, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 16/292,762

(22) Filed: Mar. 5, 2019

(65) Prior Publication Data
US 2020/0285592 A1 Sep. 10, 2020

(51) Int. Cl.
*G06F 12/126* (2016.01)
*G06F 12/084* (2016.01)
*G06F 12/0811* (2016.01)

(52) U.S. Cl.
CPC .......... *G06F 12/126* (2013.01); *G06F 12/084* (2013.01); *G06F 12/0811* (2013.01)

(58) Field of Classification Search
CPC .. G06F 12/126; G06F 12/0804; G06F 12/084; G06F 12/0891; G06F 2209/5021; G06F 12/121; G06F 12/0811
See application file for complete search history.

(56) References Cited

U.S. PATENT DOCUMENTS

| | | | |
|---|---|---|---|
| 6,766,419 B1 | 7/2004 | Zahir et al. | |
| 7,577,793 B2* | 8/2009 | Borkenhagen | G06F 12/0897 711/133 |
| 7,698,508 B2* | 4/2010 | Rajamony | G06F 12/0804 711/143 |
| 7,899,994 B2* | 3/2011 | Zhao | G06F 12/126 711/133 |
| 9,418,019 B2 | 8/2016 | Lepak et al. | |
| 2004/0083341 A1* | 4/2004 | Robinson | G06F 12/126 711/133 |
| 2006/0143396 A1 | 6/2006 | Cabot | |

(Continued)

*Primary Examiner* — Zhuo H Li
(74) *Attorney, Agent, or Firm* — Cantor Colburn LLP; William Kinnaman

(57) ABSTRACT

Embodiments of the present invention are directed to a computer-implemented method for cache eviction. The method includes detecting a first data in a shared cache and a first cache in response to a request by a first processor. The first data is determined to have a mid-level cache eviction priority. A request is detected from a second processor for a same first data as requested by the first processor. However, in this instance, the second processor has indicated that the same first data has a low-level cache eviction priority. The first data is duplicated and loaded to a second cache, however, the data has a low-level cache eviction priority at the second cache.

14 Claims, 4 Drawing Sheets

(56) References Cited

U.S. PATENT DOCUMENTS

| | | | |
|---|---|---|---|
| 2007/0186045 A1* | 8/2007 | Shannon | G06F 12/0811 |
| | | | 711/133 |
| 2008/0086598 A1 | 4/2008 | Maron et al. | |
| 2015/0067266 A1* | 3/2015 | Jafri | G06F 12/0804 |
| | | | 711/136 |
| 2017/0039144 A1 | 2/2017 | Wang et al. | |

* cited by examiner

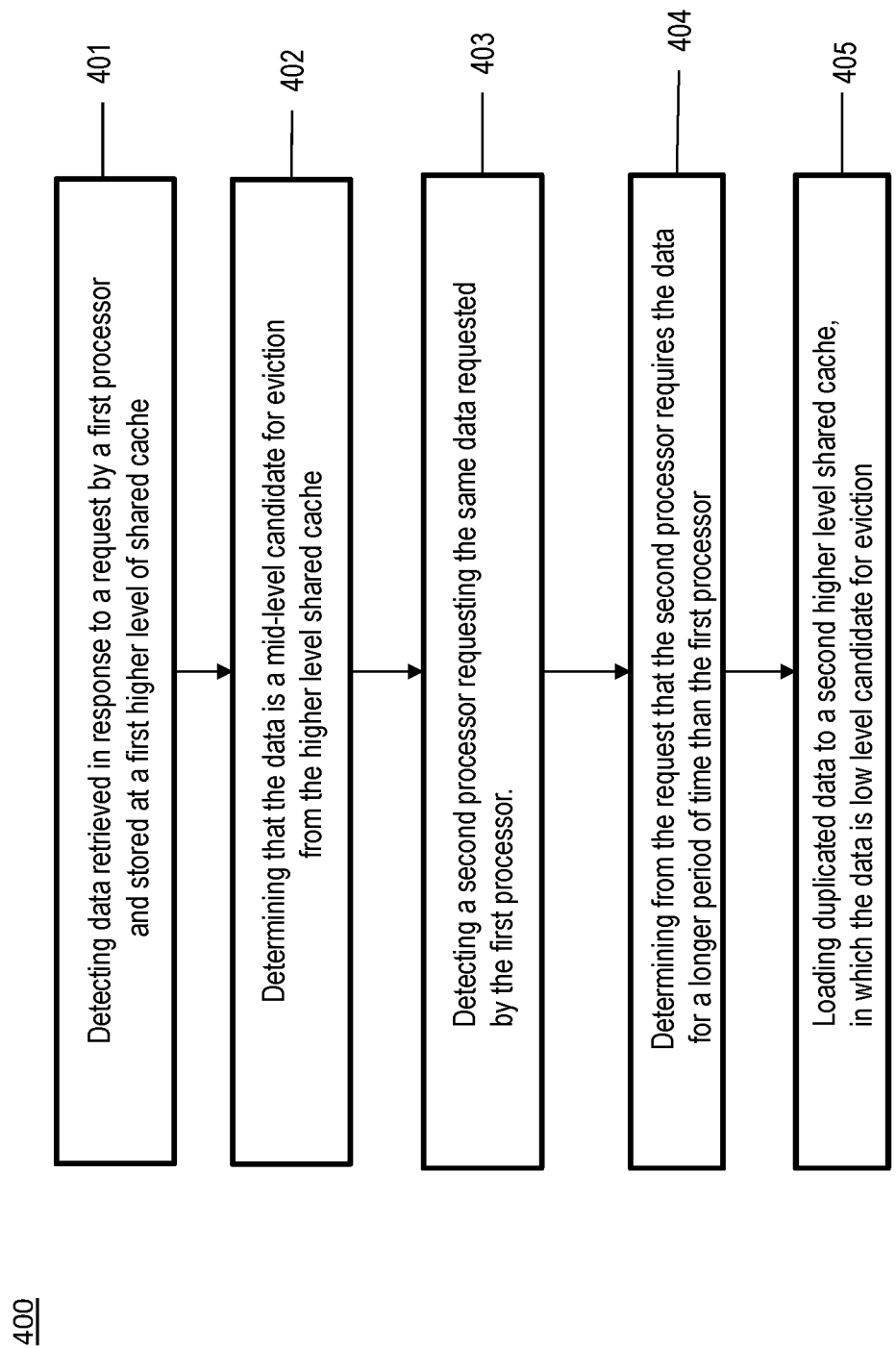

MULTILEVEL CACHE EVICTION MANAGEMENT

BACKGROUND

The present invention generally relates to data processing, and more specifically, to the operation of multilevel cache eviction management in a symmetric multiprocessing computer system.

Modern day computing systems implement multi-node symmetric multiprocessing (SMP) to process program instructions. SMP computer architecture is configured to process programs using multiple processors that are connected to a common operating system and a common memory. Additionally, the hardware processors share the I/O bus or data path. The operating system manages all of the hardware and logical processors in the multiprocessor system and treats each processor as an individual processor. SMP architecture is a dominant architectural choice in today's multiprocessor computer systems and provides the ability to balance workloads across computers dynamically.

SUMMARY

Embodiments of the present invention are directed to a computer-implemented method for cache eviction. A non-limiting example of the computer-implemented method includes detecting a first data in a shared cache and a first cache in response to a request by a first processor. The first data is determined to have a mid-level cache eviction priority. A request is detected from a second processor for a same first data requested by the first processor. However, in this instance, the second processor has indicated that the same first data has a low-level cache eviction priority. The first data is duplicated and loaded to a second cache, however, the data has a low-level cache eviction priority at the second cache. Embodiments of the present invention are directed to a system for cache eviction. The computer system includes a memory and a hardware processor system communicatively coupled to the memory. The processor system is configured to perform the computer-implemented method.

Embodiments of the invention are directed to a computer program product for cache eviction, the computer program product comprising a computer readable storage medium having program instructions embodied therewith. The program instructions are executable by a processor to cause the processor to perform a method. The computer product comprises a computer readable storage medium embodied with program instructions. The instructions are executable by a hardware processor and cause the hardware processor to perform the computer-implemented method.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts a flow diagram of a method for cache eviction according to one or more embodiments of the invention.

Figure 1:
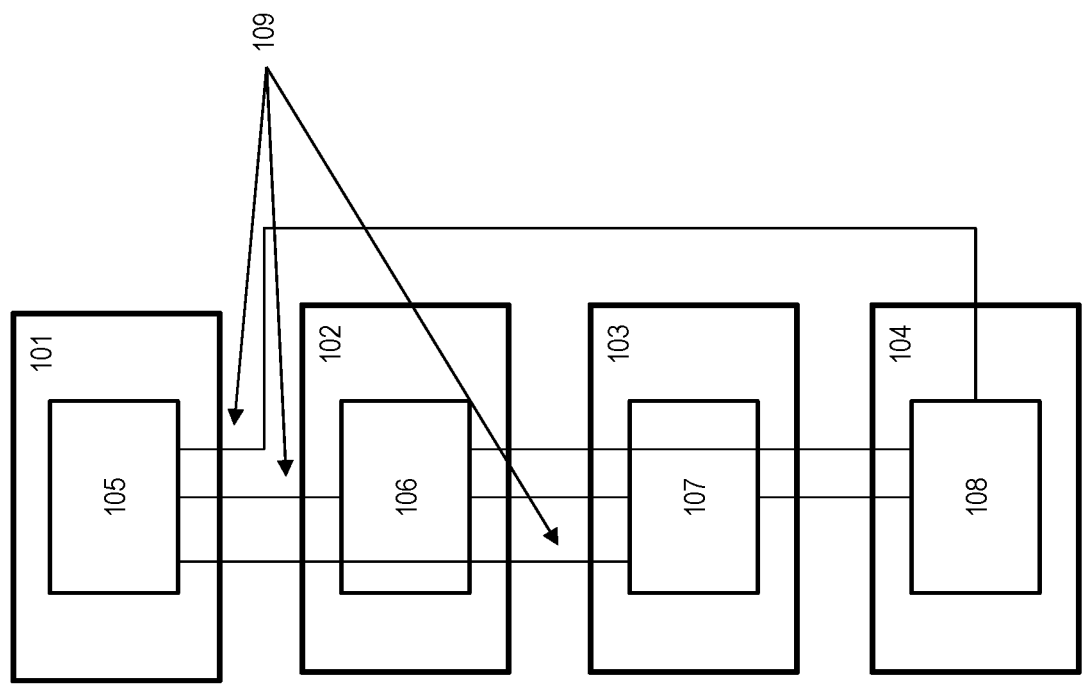
FIG. 1 depicts a block diagram of a unit of processing drawers for use in implementing one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one"

and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based on the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention. Many systems employ multi-level shared cache memory architectures to manage data storage. These architectures are designed to provide processor high-speed access to requested data and improve computing speeds. Typically, a processor is in operable communication with one or more tiered levels of cache, and system memory. When a processor needs to fetch data to complete an operation, each level of the cache is searched from lowest to highest level of cache. Data that is fetched from system memory is loaded to cache and unused data is evicted back to main memory.

To efficiently manage available space, a system typically employs a cache eviction algorithm that manages the loading and eviction of data between different cache levels and main memory. Cache eviction is either performed automatically or manually by a user. Different applications employ different cache eviction algorithms. For example, a least recently used (LRU) policy releases (evicts) an oldest data block from the cache. A least frequently used (LFU) policy evicts the least frequently used data block from the cache. A first in first out (FIFO) policy evicts the data block that is first placed in the cache.

In typical computing system data is shared by multiple processors. Therefore, data that is fetched from main memory by one processor may be needed by another processor. In some instances, each of these processors is fetching the data in response to executing distinct instructions. In other words, one processor is using the same data for a different purpose than another processor. In these situations, one processor is only using the data for a short period of time, whereas another processor needs the same data for an extended period of time.

For example, a first processor is performing data compression or video processing. Data compression and video processing require operating on a massive amount of data, but only for a short period of time. If this data is not available in the cache, the data will be fetched from main memory. The large amount of data is loaded to a higher level cache and due to the recency that data is loaded, the data is the least likely to be a candidate for eviction by a cache eviction algorithm. When the first processor transmits instructions to fetch the data, it includes an early eviction bit that signals the cache eviction algorithm that although the data is the most recently used, the data is a candidate for early eviction.

During the operation by the first processor, a second processor has requested the same data for a different purpose and needs it for a greater amount of time. If this data is loaded onto a cache shared by both processors, the data could be evicted earlier, due to the early eviction bit. This causes the second processor to lose access to the data. Although conventional cache eviction algorithms focus on optimizing efficiency at lower levels of cache, issues involving higher levels have been ignored.

Turning now to an overview of the aspects of the invention, one or more embodiments of the invention address the above-described shortcomings of the prior art by providing systems and methods for a multilevel shared cache system that organizes higher levels of cache and shared cache to recognize a processor's data needs and modify the data's candidacy for eviction.

FIG. 1 depicts a system 100 of four interconnected processing units or drawers 101, 102, 103, 104 in accordance with one or more embodiments of the present invention. Although FIG. 1 depicts a system of four interconnected processing units or drawers, it should be appreciated that in other embodiments a system could include any number of processing units or drawers. Processor drawer 101 connects to drawer 102, drawer 103, and drawer 104 via a storage controller (SC) chip 105. The other processor drawers 102, 103, 104 each include a respective SC chip 106, 107, 108. The SC chips connect to each other via bus lines 109. Intra-drawer communication is achieved by receiving and transmitting signals via a combination of these bus lines 109.

Figure 2:
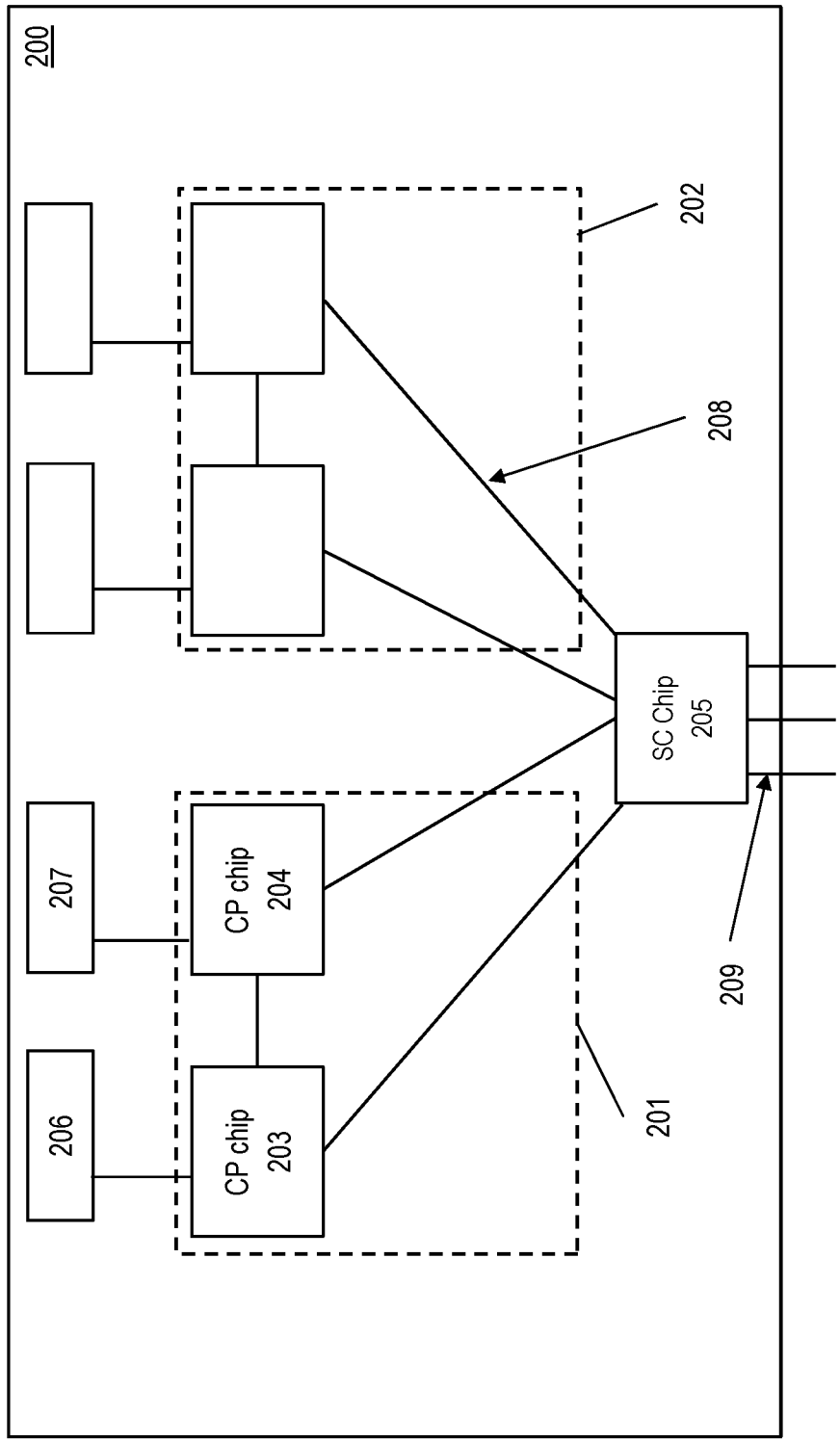
FIG. 2 depicts a block diagram of a processing drawer for use in implementing one or more embodiments of the present invention.

FIG. 2 depicts a processor drawer 200 including any one of the processor drawers 101, 102, 103, 104 shown in FIG. 1, according to one or more embodiments of the present invention. Referring now to FIG. 2, the processor drawer 200 includes two central processor (CP) clusters 201, 202. Each cluster 201, 202 includes two CP chips operatively connected to an SC chip 205 and each other within the respective cluster. For example, CP cluster 201 includes two CP chips 203, 204 operatively connected to each other and an SC chip 205. The SC chip 205 includes L4 cache (not shown), an inclusive memory or victim cache that is connected to multiple CP chips and the L3 cache (not shown) of each CP chip. Each CP chip 203, 204 within a cluster 201, 202 connects to system memory 206, 207. As seen in FIG. 2, CP cluster 201 is operatively connected with another CP cluster 202 via bus lines 208 through the storage controller 205. The processor drawer 200 is connected to other drawers via bus lines 209. Although the processor drawer 200 seen in FIG. 2 includes two CP clusters with each having two CP chips, it should be appreciated that in other embodiments a drawer includes any number of CP clusters that each include any number of CP chips that are used to execute any functionally as described herein.

The SC chip 205 is a logic circuit that manages cache memory and provides an interface between processors, caches, and main memory. Although FIG. 2 shows the SC chip 205 is external to the CP chips 203 204, SC chips can be integrated directly into the CP chips. The SC chips incorporate an L4 cache memory that is shared by each of the CP chips in a respective processor drawer 101, 102, 103, 104.

Figure 3:
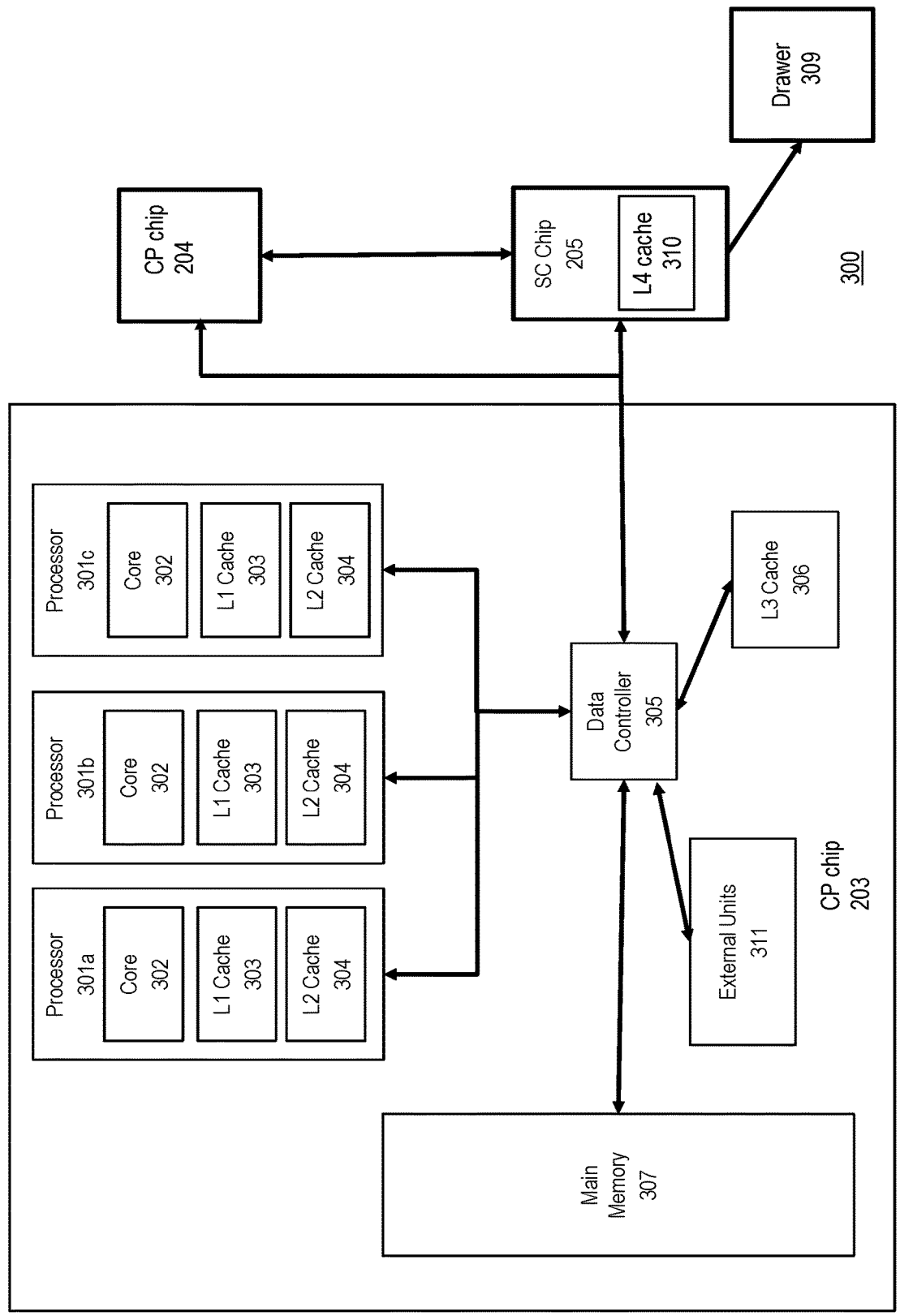
FIG. 3 depicts a block diagram of a computer system for use in implementing one or more embodiments of the present invention.

Referring to FIG. 3 a block diagram illustrating an exemplary symmetric multiprocessor (SMP) computer system 300 is shown. Although only one CP cluster is shown in FIG. 3, it should be appreciated that an SMP system 300 typically includes multiple CP clusters. In FIG. 3, one CP chip 203 has been expanded to provide further detail. As described above, each CP cluster includes multiple CP chips. For illustration purposes, the CP clusters 201, 201 as shown in FIG. 2 include two CP chips. However, as suggested earlier a CP cluster includes any number of CP to execute its desired functionality. As illustrated, the expanded CP chip 203 includes three processors 301*a*, 301*b*, 301*c*, but can include fewer or additional processors. Each processor includes one or more cores 302, a level 1 (L1) cache 303, and a level 2 (L2) cache 304. Each processor 301*a*, 301*b*, 301*c* is configured to be in operative communication with a data controller 305. The data controller 305 is configured to access data from the level 3 (L3) cache 306 and the level 4 (L4) cache 310. The data controller is in operable communication with an SC chip 205. As described above, the SC chip 205 is a logic circuit that manages cache memory and provides an interface between processors, caches, and main memory 307.

Main memory 307 includes physical memory storage that is internal to the computer. Main memory 307 is sometimes be referred to as random access memory (RAM) or primary storage. The main memory 307 provides storage for program instructions and data for execution and fetching during data processing. Program instructions and data contained on external sources, for example, discs, flash drives, and USB sticks are copied onto main memory 307 prior to execution.

The L1 cache 303, L2 cache 304, L3 cache 306, and L4 cache 310 are hierarchical levels of memory storage. The L1 cache 303 is the smallest cache and is located closest to the processor core 302. In some embodiments, the L1 cache is split between a data cache and an instructions cache. The L2 cache 304 is larger than the L1 cache and located the second closest to the processor core 302. In some embodiments, the L1 cache 303 and L2 cache 304 can employ an inclusive design and store duplicated data from one cache onto the other cache. In other embodiments, the L1 and L2 caches 303 304 employ an exclusive design and not share any data. Generally, the L2 cache is not split and is a resource for the L1 cache. As depicted in FIG. 3, the L1 cache 303 and the L2 cache 304 are located on the CP chip 203. In older systems, the L2 cache 304 would have generally been found off the chip. The L1 cache 303 and the L2 cache 304 are exclusive to a respective processor core 302.

On the other hand, the L3 cache 306 is a shared cache and provides memory storage for CP chip 203. It should be appreciated the L3 cache 304 is configured to provide storage for any number of CP chips and any number of processor cores that are attached to its data controller 305. In conventional systems, the L3 cache is usually assigned to a set of processor cores. The L4 cache 310 is an inclusive cache or victim cache that is in operable connection with multiple L3 caches 304 and as a result, each of the processor cores that the respective L3 caches 304 are servicing. Therefore, the L4 caches 310 are required to manage large amounts of instructions and data between each of the processor cores. The external units 311 provides an interface to communicate using a technology such as Universal Serial Bus (USB), PS/2, BLUETOOTH, infrared, serial port, internet, parallel port, and/or other appropriate technology. The external units 311 for example, receive input data from an input device such as a keyboard, a mouse, a trackball, a touch screen, a touch pad, a stylus pad, and/or other device. Alternatively or additionally, the external units 311 communicate output data.

The caches are each hierarchically smaller and faster than main memory 307, and each cache stores copies of data from recently used main memory locations. When a processor needs to fetch data or instructions, the processor will sequentially check each cache to find the instruction or data. The instructions or data are stored in each cache on cache lines. The most recently retrieved instructions or data are found in the L1 cache 303 and the subsequent caches store data based on a diminishing use. Data used by processors is loaded to L1/L2 cache 303 304. L3 inclusive caches hold copies of data in L2 caches. The least recently received instructions or data are stored in main memory 307.

Cache replacement policies store instructions and data based on a prediction as to what a processor is most likely going to fetch next. Optimally, a cache replacement policy loads the data that processor is going to fetch in the L1 cache 303. A cache hit occurs when the processor fetches the desired data from the L1 cache 303. A cache miss occurs when the desired data is not located in the L1 cache 303. In this instance, the processor moves to inspect the L2 304 cache for the desired data and subsequently the L3 cache 306, L4 cache 310 and main memory 307 if the data cannot be found. Some cache misses occur due to cache thrashing, in which multiple processors or a single processor fetch in large portion of data into all levels of cache. These large data sets will replace previous data which might be used by different processes, thus resulting in their miss next time they need that data. The cache system loads data on to lower level caches based on a probability as to the likelihood that a processor will fetch the data. The cache system evicts data to higher levels of cache to create space at the lower cache levels.

Referring to FIG. 3, when a processor core 302 on CP chip 203 can call for some desired data, the system 300 iteratively searches the L1 cache 303, then the L2 cache 304, and then the L3 cache 306. If searching each level of cache results in a cache miss, the data controller 305 searches for the desired data on the other CP chips 203, 204 (from CP cluster 201 in FIG. 2) and the SC Chip 205. As described above, the SC Chip 205 is configured to include L4 cache 310, in which case it checks the L4 cache 310 for the desired data. The SC chip 205 is configured to request the desired data from other CP clusters, (for example, CP cluster 202 from FIG. 2). If the desired data is found, the data is fetched from the cache line and operated on by the processor core 302. If the desired data is not found, the data controller 305 expands the search to additional drawers and then to main memory. If the data controller 305 still has not found the desired data, the data controller searches main memory for the desired data. Main memory is located the farthest in distance from the processor core 302 and also contains the most data that needs to be searched for the desired data. As a result, main memory 307 is the slowest source for fetching data.

Referring back to FIG. 3 a processor core 302 requests data to execute the next set of instructions on a ready queue. The early eviction bit is introduced to a cache line by the processor core 302, by the data controller 305 along with a request for data. For example, if the L3 cache 306 is in operable communication with an accelerator via the data controller 305, the accelerator determines that the requested cache lines are not likely to be fetched again. In this instance, the accelerator can create and transmit an early eviction bit along with a request for data. The early eviction bit signals the cache eviction algorithm that the cache lines should be indexed midway along a spectrum of most recently used and least recently used.

The determination that a cache line should include an early eviction bit can be based on an amount of time that the processor will operate on data. A user or system administrator sets a first threshold amount of time. The early eviction bit is transmitted in response to the amount of time that the processor is expected to operate in the data being less than the first threshold.

The early eviction bit provides a signal to a cache eviction algorithm as to whether a cache line should be indexed to an MRU tier, a mid-level LRU tier, an LRU tier, or remain as previously indexed used along with other information, such as requester of the line and type of request. The LRU policy monitors requests for data and maintains an order of the data from the most recently used to the least recently used. For example, if data "a", "b", and "c" were requested in this order, "c" would be the most recently used, "b" would a mid-level recently used, and "a" would be a least recently used. If for example, data "a", "b", "c", and then "d" were requested, "d" would be the most recently used, "b" and "c" would a mid-level recently used, and "a" would be a least recently used. In both scenarios, the cache eviction policy would place at the highest eviction priority. In the first scenario "c" would have the lowest eviction priority and in the second scenario "d" would have the lowest eviction priority. In the first scenario, "b" would have a mid-level eviction priority and in the second scenario, both "b" and "c" would have a mid-level eviction priority with "c" having a slightly higher eviction priority. The early eviction bit can be passed through via an interface only or can be stored with the address from the processor to a higher level cache. Using the second scenario, if a data request for "d" was received with the early eviction bit, the cache eviction policy would have "c" as having the highest eviction priority and place "d" between "a" and "b" or between "b" and "c" in terms of priority at a mid-level. The choice of placing "d" before or after "b" can be predetermined by a user or system administrator. Data that has a highest level cache eviction policy or is the least recently used is the most likely to be evicted. Data that has a lowest level cache eviction policy or is the most recently used is the least likely to be evicted. Data that has a mid level cache eviction policy or is the mid-least recently used is the likely to be evicted before the most recently used and after the least recently used. The data position is not static along this spectrum and changes based on new data being stored and old data being evicted. In some embodiments, the cache is subdivided into quartiles and the first quartile is the most recently used, the second and third quartiles are the mid-level least recently used and the fourth quartile is the least recently used data or instructions.

The early eviction bit can also be removed at each cache level. For example, a processor core can fetch a cache line that it intends only to use once or a limited number of times. A general cache eviction algorithm would index this cache line in an MRU tier. However, according to embodiments of the present invention, creating an early eviction bit could signal the cache eviction algorithm that although this cache line was recently fetched, the processor does not intend to fetch the cache line again. The cache eviction algorithm could then index the cache line for the mid-level LRU tier. However, a second processor core could intend to use the same cache line for an extended period. The cache line can be updated, and the early eviction bit can be removed. When the second processor core fetches the cache line, the cache line is indexed for the MRU tier.

This method provides the system the flexibility to designate which cache lines should be evicted. Cache lines can be indexed to a mid-level LRU tier to avoid eviction, but the at the mid-level LRU tier cache lines are not permitted to linger in the cache. Furthermore, this solution is less expensive than conventional methods because the early eviction bit is stored in the cache, but is not stored in main memory. The method further does not require multiple MRU/LRU algorithm bits which can quickly increase relative to the number of set increases.

FIG. 4 depicts a flow diagram of a method for cache eviction according to one or more embodiments of the invention. The method 400 detecting data retrieved in response to a request by a first processor at block 401. In some embodiments, the data is stored at L4 cache and duplicated at L3 cache. At block 402, the method includes determining that the data is a mid-level candidate for eviction from the higher level shared cache. The determination is based on detection of an early eviction bit transmitted along with instructions from a first processor to fetch the data. The early eviction bit follows the data and is stored at each cache line in a first L3 and the L4 cache. The early eviction bit provides a signal to the cache eviction algorithm, that although the data is the most recently used, the data is being used for a short period of time and therefore can be evicted earlier. The determination of whether to include the early eviction bit is based in part on whether the period time that the processor is using the data is greater than or less than a first threshold. The first threshold is determined manually by a user or a system administrator. The system also enables the user or system administrator to manually adjust the first threshold.

The system detects a second processor requesting the same data as the first processor at block 403. This processor shares data with the first processor at the L4 cache level and has access to a second L3 cache. However, this request does not include the early eviction bit. Therefore, the system recognizes that the data is a low level candidate for eviction from the cache at block 404. The system duplicates the data from L4 cache to a second L3 cache at block 405. In this instance the data in the L4 cache is duplicated to the second L3 cache and is not a candidate for early eviction. The data in the first L3 cache remains a candidate for early eviction. In other words, the systems cache eviction algorithm manages each cache separately. The L4 cache is updated to remove the indicator bit to signal to the cache eviction algorithm that the data is no longer a mid level candidate for eviction and is a low level candidate for eviction. The data is evicted from the cache based on a determination of the cache eviction algorithm. It should be appreciated that in some scenarios at some point the data in an L3 cache and L4 cache include early eviction bits and no other processor is currently claiming the data. In this instance, the data in L4 cache maintains the early eviction bit or the instance that another processor no longer is claiming the data, an early eviction bit that was removed due to the other processor claiming the data can be reintroduced to the data in the L4 cache.

Additional processes may also be included. It should be understood that the processes depicted in FIG. 4 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for cache eviction, the method comprising:

detecting first data in a shared cache and the same first data in a first cache in response to a request by a first processor, determining that the first data and the same first data have a mid-level cache eviction priority at the first cache and the shared cache, wherein determining that the first data has a mid-level cache eviction priority is based on the presence of an early eviction bit, and wherein the presence of the early eviction bit is based in part on an estimated time the first processor operates on the first data;

detecting a request from a second processor for the same first data as requested by the first processor;

determining that the second processor requires the first data for a longer period of time than the estimated time the first processor operates on the first data;

loading duplicated first data to a second cache, wherein the duplicated data has a low-level cache eviction priority at the second cache; and removing the early eviction bit of the first data at the shared cache.

2. The computer-implemented method of claim 1, wherein the shared cache is level 4 (L4) cache.

3. The computer-implemented method of claim 1, wherein first cache and the second cache are each a respective level 3 (L3) cache.

4. The computer-implemented method of claim 1, wherein determining that the second processor requires the first data for a longer period of time than the estimated time the first processor operates on the first data is based in part on the absence of an early eviction bit in the request for data from the second processor.

5. The computer-implemented method of claim 1, wherein the first cache and the shared cache are managed under a least recently used (LRU) algorithm.

6. A system for cache eviction, the system comprising:
a processor communicatively coupled to a memory, the processor configured to:
  detect a first data in a shared cache and a same first data in a first cache in response to a request by a first processor,
  determine that the first data and the same first data have a mid-level cache eviction priority at the first cache and the shared cache, wherein determining that the first data has a mid-level cache eviction priority is based on the presence of an early eviction bit, and wherein the presence of the early eviction bit is based in part on an estimated time the first processor operates on the first data;
  detect a request from a second processor for a same first data as requested by the first processor;
  determine that the second processor requires the first data for a longer period of time than the estimated time the first processor operates on the first data;
  load duplicated first data to a second cache, wherein the duplicated data has a low-level cache eviction priority at the second cache; and
  remove the early eviction bit of the first data at the shared cache.

7. The system of claim 6, wherein the shared cache is a level 4 (L4) cache.

8. The system of claim 6, wherein first cache and the second cache are each a respective level 3 (L3) cache.

9. The system of claim 6, wherein determining that the second processor has requires the first data for a longer period of time than the estimated time the first processor operates on the first data is based in part on the absence of an early eviction bit in the request for data from the second processor.

10. The system of claim 6, wherein the first cache and the shared cache are managed under a least recently used (LRU) algorithm.

11. A computer program product for cache eviction, the computer program product comprising a computer readable storage medium having program instructions embodied therewith, the instructions executable by a processor to cause the processor to:
  detect first data in a shared cache and the same first data in a first cache in response to a request by a first processor,
  determine that the first data and the same first data have a mid-level cache eviction priority at the first cache and the shared cache, wherein determining that the first data has a mid-level cache eviction priority is based on the presence of an early eviction bit, and wherein the presence of the early eviction bit is based in part on an estimated time the first processor operates on data;
  detect a request from a second processor for the same first data requested by the first processor;
  determine that the second processor requires the first data for a longer period of time than the estimated time the first processor operates on the first data;
  load duplicated first data to a second cache, wherein the duplicated first data has a low-level cache eviction priority at the second cache; and
remove the early eviction bit of the first data at the shared cache.

12. The computer program product of claim 11, wherein the shared cache is a level 4 (L4) cache.

13. The computer program product of claim 11, wherein first cache and the second cache are each a respective level 3 (L3) cache.

14. The computer program product of claim 11, wherein determining that the second processor requires the first data for a longer period of time than the estimated time the first processor operates on the first data is based in part of the absence on an early eviction bit in the request for data from the second processor.

* * * * *